(12) United States Patent
Vigneswaran

(10) Patent No.: US 11,863,535 B2
(45) Date of Patent: Jan. 2, 2024

(54) METHODS, DEVICES, AND SYSTEMS FOR SECURE COMMUNICATIONS OVER A NETWORK

(71) Applicant: u-blox AG, Thalwil (CH)

(72) Inventor: Hariharasudhan Vigneswaran, Malmo (SE)

(73) Assignee: u-blox AG, Thalwil (CH)

( * ) Notice: Subject to any disclaimer, the term of this patent is extended or adjusted under 35 U.S.C. 154(b) by 339 days.

(21) Appl. No.: 17/128,943

(22) Filed: Dec. 21, 2020

(65) Prior Publication Data
US 2022/0200971 A1   Jun. 23, 2022

(51) Int. Cl.
*H04L 9/40*   (2022.01)
(52) U.S. Cl.
CPC ........ *H04L 63/0428* (2013.01); *H04L 63/061* (2013.01); *H04L 63/08* (2013.01); *H04L 2463/121* (2013.01)
(58) Field of Classification Search
CPC .... H04L 63/0428; H04L 63/061; H04L 63/08
USPC ......................................................... 713/168
See application file for complete search history.

(56) References Cited

U.S. PATENT DOCUMENTS

| | | | | |
|---|---|---|---|---|
| 6,092,191 A * | 7/2000 | Shimbo | ............... | H04L 63/0428 713/168 |
| 7,174,456 B1 * | 2/2007 | Henry | ................. | H04W 12/069 713/168 |
| 9,264,404 B1 * | 2/2016 | Lambert | ............... | H04L 9/3239 |
| 9,998,437 B2 * | 6/2018 | Kim | ..................... | H04L 63/0876 |
| 10,187,400 B1 * | 1/2019 | Castro | .................. | H04L 63/1408 |
| 2005/0005150 A1 * | 1/2005 | Ballard | ................... | H04L 63/08 726/22 |
| 2005/0160095 A1 * | 7/2005 | Dick | ....................... | H04L 67/14 |
| 2016/0182952 A1 * | 6/2016 | Wu | .................... | H04N 21/4353 725/31 |
| 2016/0277188 A1 * | 9/2016 | Quinn | .................. | H04L 9/3213 |

(Continued)

FOREIGN PATENT DOCUMENTS

KR   10-2009-0065023 A   6/2009

OTHER PUBLICATIONS

Extended European Search Report issued by the European Patent Office in counterpart European Application No. 21212866.4, dated Apr. 20, 2022 (8 pgs.).

*Primary Examiner* — Dant B Shaifer Harriman
(74) *Attorney, Agent, or Firm* — Finnegan, Henderson, Farabow, Garrett & Dunner, L.L.P.

(57) ABSTRACT

A system and a method for secure communications over a network, the method comprising: receiving a data packet from a first device, the data packet comprising an encrypted data part and a metadata part, the metadata part comprising a cleartext part and removable metadata, the removable metadata comprising a network access code that is authenticatable by means of a network access key; validating the data packet, wherein validating the data packet comprises authenticating the network access code using the network access key; removing the removable metadata from the data packet after validating the data packet, thereby altering the data packet; and transmitting the altered data packet to a second device. The system comprises a first, a second, and a third device. The third device may comprise a receiver and a transmitter, and a validator that comprises a processor and a memory.

18 Claims, 6 Drawing Sheets

(56) References Cited

U.S. PATENT DOCUMENTS

| | | | |
|---|---|---|---|
| 2016/0301695 A1* | 10/2016 | Trivelpiece | ........... H04W 12/04 |
| 2017/0094700 A1 | 3/2017 | Hong et al. | |
| 2019/0349340 A1* | 11/2019 | Zhang | ..................... H04L 63/20 |
| 2020/0084222 A1* | 3/2020 | William | ................. H04L 9/3242 |
| 2020/0252411 A1* | 8/2020 | Inforzato | ............ H04L 63/1425 |

\* cited by examiner

METHODS, DEVICES, AND SYSTEMS FOR SECURE COMMUNICATIONS OVER A NETWORK

TECHNICAL FIELD

The present disclosure relates to the field of secure communications over a network, and particularly to communications involving end-to-end (E2E) security. More specifically the disclosure concerns communication between a first device, for example a cloud server, and a second device, for example a constrained node, via a third device that is, for example, a gateway and/or a proxy to the second device.

BACKGROUND

With the establishment and widespread implementation of various technologies and devices that contribute to the development of the Internet-of-Things (IoT), there is an increasing need for developing methods and systems for secure communications over networks to which the devices are parts of. In the network(s), it is common to have a constrained end node. According to RFC 7228 (Borman et al., May 2014, Retrieved from <https://tools.ietf.org/html/rfc7228#section-2.1>), the constrained node may be a node where some of the characteristics that are otherwise taken for granted for Internet nodes are not attainable due to factors such as cost and/or constraints on characteristics such as power and energy. In the aforementioned network, one of the devices that is part of the network may be or effectively behave as a constrained end node, and may be connected to a cloud server via an intermediate proxy/gateway. The link between the proxy/gateway and the server is usually not constrained and the gateway/proxy does not usually have significant power and bandwidth constraints. Nevertheless, commonly there are severe power and bandwidth constraints on the end node. When a data packet is E2E encrypted from a server to a constrained end-node, the gateway usually becomes a blind forwarder of information. If the gateway connects a constrained network to the internet, the entire network is highly susceptible to Denial-of-Service (DoS) attacks and replay attacks using man-in-the-middle techniques that can create congestion attacking the constrained network.

Several security protocols are used as a means for protecting, at least partially, against the aforementioned attacks, and for offering end-to-end security. Two of the known protocols are (D)TLS [(Datagram) Transport Layer Security] and OSCORE (Object Security for Constrained RESTful Environments). OSCORE is a lightweight E2E security protocol; a description of OSCORE is provided in: Selander, G., Mattsson, J., Palombini, F. and Seitz, L., July 2019. "Object security for constrained restful environments (oscore)", ISSN: 2070-1721. OSCORE has a data-metadata concept according to which a data packet comprises data that is encrypted from source to destination (E2E secure) and also comprises meta-data that is in cleartext. Providing E2E security for constrained node/networks using OSCORE, and using the latter for increasing the robustness and efficiency of the nodes, are quite recent.

SUMMARY

Embodiments of the present disclosure provide improved methods, devices, and systems for secure communications over a network.

These embodiments include a method for secure communications over a network. The method comprises receiving a data packet from a first device, the data packet comprising an encrypted data part and a metadata part, the metadata part comprising a cleartext part and removable metadata, the removable metadata comprising a network access code that is authenticatable by means of a network access key; validating the data packet, wherein validating the data packet comprises authenticating the network access code using the network access key; removing the removable metadata from the data packet after validating the data packet, thereby altering the data packet; and transmitting the altered data packet to a second device.

These embodiments also include a third device for secure communications over a network. The third device comprises a receiver configured to receive a data packet from a first device, the data packet comprising an encrypted data part and a metadata part, the metadata part comprising a cleartext part and removable metadata, the removable metadata comprising a network access code that is authenticatable by means of a network access key; a validator coupled to the receiver and comprising: a memory storing the network access key and instructions, and a processor configured to execute the instructions to cause the validator to validate the received data packet by: authenticating the network access code using the network access key; and removing the removable metadata from the data packet to alter the data packet; and a transmitter coupled to the validator and configured to receive the altered data packet and transmit the altered data packet to a second device.

These embodiments further include a system for secure communications over a network. The system comprises a second device configured to receive an altered data packet from a third device; and the third device comprising: a receiver configured to receive a data packet from a first device, the data packet comprising an encrypted data part and a metadata part, the metadata part comprising a cleartext part and removable metadata, the removable metadata comprising a network access code that is authenticatable by means of a network access key; a validator coupled to the receiver and comprising: a memory storing the network access key and instructions, and a processor configured to execute the instructions to cause the validator to validate the received data packet by: authenticating the network access code using the network access key; and removing the removable metadata from the data packet to alter the data packet; and a transmitter coupled to the validator and configured to receive the altered data packet and transmit the altered data packet to the second device.

BRIEF DESCRIPTION OF THE DRAWINGS

The advantages and characteristics of the disclosure will be more apparent from the following description which, without limiting main claim, explains certain preferred embodiments of the disclosure, referring to the figures.

DETAILED DESCRIPTION

Figure 1:
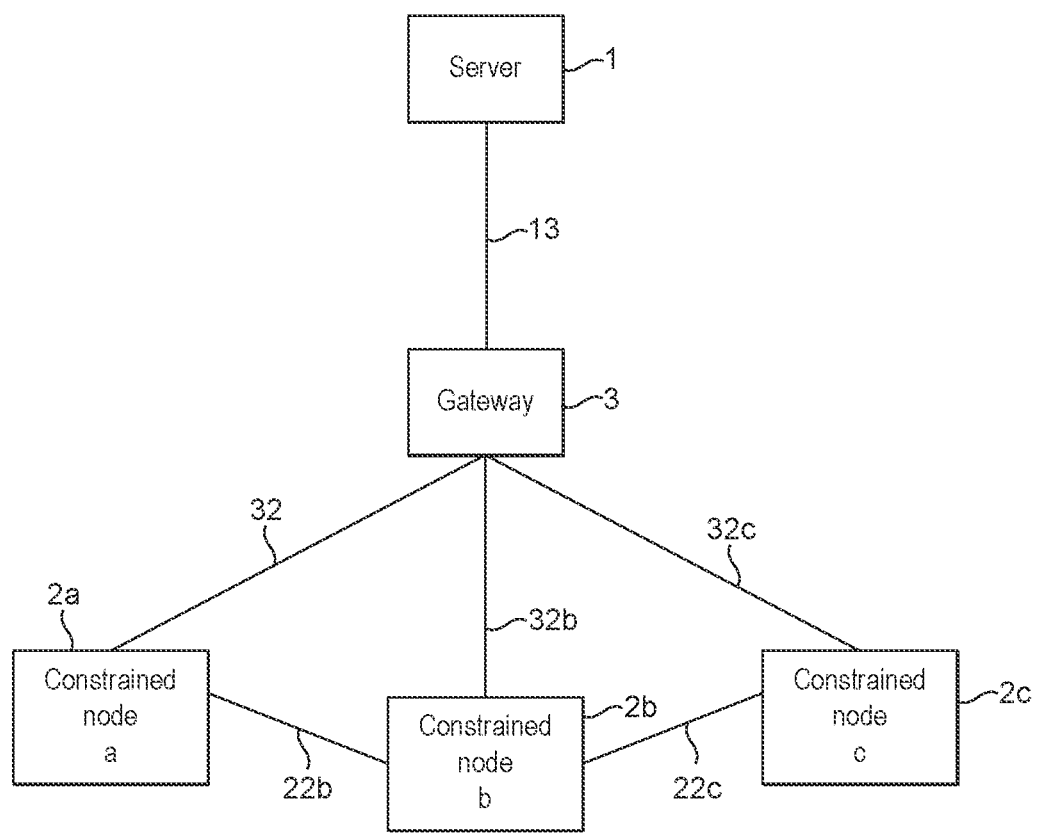
FIG. 1 is a schematic diagram of a system according to one aspect of the disclosure.

A combination of OSCORE and (D)TLS can be used to provide network authentication and validation without compromising on E2E security, but this may lead to decreased performance at the gateway/proxy. Therefore, there is a need for providing secure and encrypted communications over a network, particularly a network comprising constrained nodes, without significantly decreasing the performance at the gateway/proxy or at the end nodes.

The present disclosure provides secure and encrypted communications over a network, particularly a network comprising constrained nodes, without significantly increasing the bandwidth and power requirements and without decreasing the performance. Advantageously, the solution provided herein can be implemented using network hardware, e.g. using a gateway, without the need to employ powerful and costly systems; relatively small and inexpensive hardware may protect the entire network.

According to a first aspect of the present disclosure, there is provided a method for secure communications over a network. The method comprises receiving a data packet from a first device, the data packet comprising an encrypted data part and a metadata part, the metadata part comprising a cleartext part and removable metadata, the removable metadata comprising a network access code that is authenticatable by means of a network access key; validating the data packet, wherein validating the data packet comprises authenticating the network access code using the network access key; removing the removable metadata from the data packet after validating the data packet, thereby altering the data packet; and transmitting the altered data packet to a second device.

In some embodiments, the network may comprise parts and channels wherein the communications are done wirelessly and/or via wirelines. The communications may comprise the transmitting and receiving steps of the method.

In some embodiments, the removable metadata may be in cleartext or comprise a cleartext portion (a portion in cleartext). The term "cleartext" may be interpreted as meaning data (i.e. information) that is transmitted or stored unencrypted ('in clear'). The network access code and/or the entire removable metadata may also be encrypted (ciphered), and accordingly, the network access key may be required for decrypting (deciphering) the network access code and/or for decrypting (deciphering) the entire removable metadata when the latter is encrypted (ciphered).

As described herein, the third device can be provided as a gateway, but alternatively, it may be a proxy device. Likewise, the third device can serve as a proxy to the second device. Further, the third device can serve as a gateway and a proxy to the second device. In the latter case, the gateway, i.e., the gateway device, may be configured to perform both proxying and protocol translation.

It can be understood, that in the context of the present disclosure the encrypted data part of the data packet and the cleartext part may be destined to be received by the second device, wherein the encrypted data part is to be decrypted. Therefore, the method of the first aspect of the disclosure may also comprise receiving at the second device the altered data packet transmitted from the third device. Likewise, the method may also comprise decrypting at the second device the encrypted data part. The altered data packet may comprise the encrypted data part, and may also comprise the cleartext part that may be destined to be received by the second device. The altered data packet does not comprise the removable metadata which, according to the method, are removed from the data packet, thereby altering the latter upon (after) authenticating the network access code at the third device.

Likewise, it is contemplated optionally providing to the second device an encryption key that is required for decrypting the encrypted data part of the data packet. Providing the encryption key may comprise deriving the encryption key from a particular trusted source, preferably a particular hardware root of trust, or may comprise pre-sharing or negotiating between the first device and the second device the encryption key that allows for, i.e. is required for, decrypting the encrypted data part of the data packet. The pre-sharing or negotiating the encryption key may comprise the first and the second device communicating between them via the same network over which the data packet and the altered data packet are transmitted, or via a different network or different communication channel/link.

The features of authenticating at the third device, e.g., at the gateway, the network access code for the purpose of validating the data packet, and also removing at the third device the metadata part comprising the code, directly contribute to increasing the resource efficiency in the network and in the second device, especially when the latter is a constrained node, i.e., a constrained communication node. The aspects of firstly having an original data packet that is structured so that it can be validated at the gateway, secondly validating at the proxy/gateway the data packet, and thirdly altering the original packet so that its altered form may be light and compatible with any bandwidth and energy restrictions of the second device, allows using the third device for protecting the second device and the overall communication network against malicious attacks which might try to exploit the restrictions. This is a unique aspect of the present disclosure, given that, in existing networks, a gateway is commonly a blind forwarder of information. Moreover, since in the present method the data packet is authenticated/validated at the third device, e.g., at the gateway, it allows for the possibility to safely accumulate or queue data packets at the third device before forwarding them to the second device. This may be useful in cases in which the second device due to power limitations or its specific functionality temporarily stops communicating with the third device and/or the rest of the network, and/or when the second device temporarily is turned off or enters a sleep or low power consumption mode. The latter is common in IoT configurations. For example, when the second device is a relatively small module comprising a sensor such as a temperature sensor, it is common that the module enters temporarily in a sleep mode for saving power. Therefore, the method of the first aspect of the disclosure may comprise queuing at the third device a plurality of data packets. Moreover, the method may comprise altering at the third device the plurality of data packets in the aforementioned way, thereby producing a plurality of altered data packets which may be sent/transmitted from the third to the second device when the latter communicates with the third device e.g. when the second device exits a sleep mode.

From the above, it will now be understood that the present disclosure contemplates a case wherein the second device may exit and/or enter sleep mode. Likewise, the present disclosure contemplates a case wherein the second device may exit sleep mode and may contact the third device. Moreover, the third device may send the queued packets to the second device, preferably after or upon the third device being contacted by the second device as described above. As is explained further below, a data packet may comprise an expiration time. If and when the data packets are queued at the third device, and the data packets comprise an expiration time (or more than one expiration time), it is contemplated that the third device may check if the expiration time (or the more than one expiration time) has (have) passed or not. The third device may send the queued data packets to the second device after checking that the expiration time (or the more than one expiration time)) has (or have) not passed. Preferably, the third device may obtain a current time via the first device. In a non-binding example, the first device is a cloud server and the third device obtains from the cloud server a current time. Likewise, the third device may have its own clock. In a non-binding example, the third device has a GPS clock that provides a time to the third device.

For decreasing the possibility that an unauthorized or malicious third party intercepts and validates the network access code of the data packet, the network access key required for the validation may be provided to the third device, e.g., to the gateway, via a trusted and secure way. Therefore, in some embodiments, the method of the first aspect of the disclosure may further comprise providing to the third device the network access key, and providing the network access key may comprise at least one of:

deriving the network access key from a trusted source, preferably a hardware root of trust; or pre-sharing the network access key between the first device and the third device; or negotiating the network access key between the first device and the third device.

The aforementioned hardware root of trust may be connected to, or comprised by, the third device. Likewise, the hardware root of trust may have a secure environment and may be configured to generate the key, protect the key, as well as to perform cryptographic functions within the secure environment. Likewise, the trusted source may be a root of trust that comprises hardware, and/or software and/or firmware components.

The aforementioned pre-sharing or negotiating the network access key between the first device and third device may be performed with the devices communicating and exchanging information between them via the same network or network channel/link used for transmitting the data packet, or via a different network or different channel/link. Further, there is contemplated a case wherein the first device and the third device may be connected via a secure communication channel (link) used for pre-sharing and/or negotiating the network access key, before or during the transmittance via the network of the data packet or of a set of data packets. The secure communication channel may be part of a separate network within which communication signals are exchanged wirelessly and/or via wire connections. Likewise, the network access key may be provided or inputted to the third device manually, or by means of connecting to the third device an information storage medium that contains the network access key. For example, the information storage medium may be a magnetic storage medium or an optical storage medium (e.g. an optical disc).

The data packet may have time sensitive information which renders the data packet utile only if the latter is received at the third device within a certain period of time after the data packet was transmitted by the first device. The time sensitive information may be an expiration time. The time sensitive information may be part of the metadata part, or preferably may be part of the removable metadata. Accordingly, the metadata part, preferably the removable metadata, comprise the expiration time. In a non-limiting example, the expiration time is used because the encrypted data part of the data packet that is to be decrypted at the second device contains a set of information or instructions that are to be received and/or executed by the second device within a specific period of time. In another non limiting example, the expiration time exists to discard data packets that contain information that, for the purpose related to the secure communication, becomes outdated beyond the expiration time. In another non-limiting example, the expiration time exists as a means to check at the third device whether the communication of the data packet from the first device to the third device was not delayed due to an undesired interception of the data packet by a malicious or unauthorized third party. Therefore, in the method according to the first aspect of the disclosure, the metadata part, preferably the removable metadata, may comprise an indication of an expiration time, and validating the data packet may comprise validating at the third device whether the expiration time has passed, and discarding the data packet if the expiration time has passed. The discarding of the data packet may comprise deleting the data packet, or storing the data packet for further processing and/or for record keeping. Likewise, validating whether the expiration time has passed may comprise comparing the expiration time with a current first device time. When the first device is a server, such as for example a cloud server, the current first device time may be the server time. Accordingly, the method may comprise providing to the third device the current first device time. The providing may be achieved via communicating the first device time from the first device to the third device via the same network over which the data packet is transmitted, or via another network such as the aforementioned different network/channel via which the first device and the third device may pre-share or negotiate the network access key. It is noted that, the aforementioned expiration time may be in the form of a timestamp along with the data packet's authentication code. The network access code (NAC) may be a keyed message authentication code (MAC) based on the network access key. The NAC may be created/verified by the first device and the third device because the devices may have the network access key (NAK). Likewise, the authentication code may be a digital signature. The digital signature may be calculated out of the network access key and the metadata information, e.g., expiration time.

From the above, it is understood that the data packet may contain verifiable timing information which can be used for checking with the third device whether the data packet was received within a certain time. Likewise, the inclusion of timing information in data packets that constitute a set of data packets, may allow for checking that each or any of the set's data packets is sent and/or received in a correct chronological order, or with a desired chronological proximity with respect to when the other data packets of the set have been sent by the first device, or have been received by the third device. The aforementioned timing information may be a timestamp. The timestamp may indicate the moment in which the data packet is either created, or is present in the first device or is transmitted by the first device. Therefore, the moment may be indicated by the timestamp according to the first device time. Related to the latter, it is contemplated that the first device may comprise or may be connected with a clock that indicates the first device time, and the timestamp may indicate the first device time given by the clock the moment the timestamp is created. In some embodiments, the time given by the clock when validating the time packet at the third device is the aforementioned current device time. According to all the above, the verifiable timing information may alternatively comprise a sequence number. The sequence number may serve as an indication about the moment that the data packet was transmitted or received or generated with respect to the other data packets. Some non-binding examples of what the sequence number may be, are: i) a number in a sequence of numbers each of which is assigned to a data packet of a set of data packets successively generated or sent/transmitted by the first device, or ii) a number of a sequence of numbers wherein in the sequence the numerical difference ($\Delta N = N_2 - N_1$) of any two numbers (e.g. $N_1$ and $N_2$) of the sequence is linearly correlated (e.g. via the relationship $\Delta N = a*\Delta t$, wherein a is a constant) with a specific period of time (e.g. $\Delta t$). Overall, since a sequence number may serve the purpose of correlating the data packet with a set of data packets, or the purpose of identifying the (chronological) position of the data packet with respect to the other members of the set, in the latter case the sequence number being valuable within a specific context related to the set of data packets, the sequence number, or the entire sequence containing the number, may be pre-shared or negotiated between the first device and the third device so that it may be known at the third device the context within which the sequence number is to be evaluated. An optional case is contemplated in which the first and the third device may negotiate or share or exchange between them, by any mechanism, a starting sequence number. The starting sequence number may be the sequence number of a first data packet of a sequence or set of data packets to be communicated between the first and the third device. The sequence number may be incremented with every communicated data packet of the set. The first data packet may be the set's first data packet being communicated between the first and the third device. Accordingly, it is contemplated preferably incrementing, for example with respect to the first sequence number, the corresponding sequence numbers of the set's data packets that may be communicated between the first and the second device after the first data packet has been communicated between the same devices. Likewise, the pre-sharing or negotiating the sequence number, may serve for anticipating receiving at the third device the data packet or the set of data packets.

Considering the above, in the method of the first aspect of the disclosure, the removable metadata may comprise verifiable timing information, the verifiable timing information comprising a timestamp or a sequence number. In the latter case, the method may further comprise pre-sharing or negotiating between the first device and the third device the sequence number. The pre-sharing or negotiating between the first device and the third device the sequence number, or preferably the starting sequence number, is primarily contemplated for when (the case that) the metadata part comprises a sequence number that may denote chronological arrival of data packets at the third device, or chronological transmittance of data packets from the first device, or chronological creation of data packets. The creation may occur at the first device or at a data packet generation device connected to and communicating with the first device. Likewise, when the removable metadata comprises verifiable timing information that comprises a sequence number, it is contemplated that the method may comprise pre-sharing or negotiating between the first device and the third device at least one of: a rule or a recurrence relation that defines a sequence that includes the sequence number; a first sequence number of the sequence; or an initial term of the recurrence relation. A rule, that is also commonly called a recurrence relation, may define the sequence that is a number sequence. Some non-binding examples of a rule are: that all the numbers of the sequence are prime numbers; any number of the sequence differs compared to the previous number of the sequence by a fixed value e.g. −1 or +1; that each number $a_{n+1}$ of the sequence is related to the previous number an within the sequence by the relation $a_{n+1}=b*a_n+c$, wherein n is an integer that is ≥1, b and c are integral numbers, and $a_1$ that corresponds to n=1 is the first sequence number of the sequence. In the latter example, some non-binding examples of an initial term of the recurrence relation are: b=1 or 2; c=1 or 2; $a_1$=931. If the two devices negotiate the rule or the recurrence relation that defines the sequence, then this negotiation may include negotiating a description of the sequence. Two non-binding examples of the description of the sequence are: prime numbers; and prime numbers starting from 11. Advantageously, when the removable metadata comprises verifiable timing information that comprises a sequence number, the method may comprise pre-sharing or negotiating between the first device and the third device a description of the sequence that includes the data packet's sequence number, and the first number of the sequence. Accordingly, in a non-binding example the method may comprise negotiating between the first and the third device that the sequence is of prime numbers, and that the first number of the sequence is 11. In the latter case the sequence number of the first data packet would be 11, the sequence number of the second data packet would be 13, the sequence number of the third data packet would be 17, etc.

The aforementioned optional verifiable timing information may be checked or validated, with the purpose of determining at the third device whether the data packet is valid or allowable, and thus, whether the data packet should be altered and subsequently passed to the second device (or not). Checking or validating the verifiable timing information allows for blocking at the third device any data packet that is either not received on time, or that is a non-secure data packet that was not sent by the first device. Such a non-secure data packet may for example have been sent by a malicious third party as part of an attack. If the data packet is determined to be invalid or non-allowable, then the data packet may be discarded. Preferably discarding the data packet comprises any of deleting, archiving (putting/registering in a record or list) or reporting/sending to a security device/server or authority the data packet or parts (e.g. the timestamp or sequence number) of it. Therefore, in the method of the first aspect of the disclosure, in the case that the data packet's removable metadata comprises verifiable timing information, the method, particularly the step of validating the data packet, may further comprise validating (verifying) the verifiable timing information for determining whether the data packet is valid, and discarding at the third device the data packet when determining that the data packet is not valid. In the latter case there are contemplated the following two options: when the verifiable timing information comprises the timestamp, then validating the verifiable timing information may comprise comparing the timestamp with a first device time; when the verifiable timing information comprises the sequence number then validating the verifiable timing information may comprise comparing the sequence number with an expected sequence number. The expected sequence number may be deduced on the basis of the negotiation that may take place between the first and third device regarding the sequence that includes the sequence number as described further above. Accordingly, in the context of determining whether the data packet is valid or not, verifying the network access code may advantageously be complemented by validating the verifiable timing information. Likewise, validating or verifying the verifiable timing information may include: verifying the network access code using the network access key; checking whether an expiration time has passed and/or checking whether or not a time stamp or sequence number are valid or expired. Determining whether the data packet is valid may be interpreted as meaning determining whether the data packet is allowable or relevant to the second device. Likewise, determining that the data packet is not valid may be interpreted as meaning that the data packet is not allowable or not relevant to the second device.

The aforementioned timing information and sequence number may serve as a basis for deciding whether the data packet is allowable (or not). Deciding on the allowability of the data packet is most relevant to the case that a plurality of data packets is transmitted at (by) the first device and is received at (by) the second device, the data packets having sequence numbers that belong to the same or different sequences. Therefore, in the method of the first aspect of the disclosure, the data packet's verifiable timing information may comprise a sequence number, and the method may further comprise also receiving at the third device another data packet that has a corresponding (removable) metadata part that has another sequence number that belongs to a specific sequence of numbers, and the data packet may be allowable when any of the following a)-d) is true:

a) The sequence number of the data packet is different from the another sequence number of the another data packet.

If a) above is true, then that may signify that the data packet received at the third device is allowable because it is not part of an attack comprising transmitting to the third device several data packets that have the same sequence number.

b) The sequence number of the data packet belongs to the specific sequence; and/or, c) the sequence number of the data packet belongs to the specific sequence, and the sequence number and the another sequence number are arranged within the sequence in an order that is the chronological order in which the data packet and the another data packet are received at the third device.

If c) and/or b) above are true, that may signify that the data packet is allowable because it is anticipated at the third device because it is part of a set of data packets which according to their numbers and the sequence the numbers belong to, are anticipated at the third device because they are consecutively and/or orderly received at the third device, and/or because the sequence and/or the latter's numbers (members) have been additionally pre-shared or negotiated between the first and the third device.

(d) The sequence number of the data packet belongs to the specific sequence, and in between receiving at the third device the data packet and the another data packet, no third data packet having a corresponding third sequence number that does not belong to the specific sequence is received at the third device.

If d) above is true, that may signify that the data packet is allowable because its sequence number or the sequence within which the number belongs, has not been red-flagged or correlated or marked in relation to a suspicious or malicious attack against the network or any of the first, second or third device.

The altered data packet, that is the data packet resulting from altering at the third device the (original) data packet transmitted by the first device, may be (i.e. comprises/has a structure that is) according to the OSCORE protocol. Therefore, it is also contemplated that the method of the first aspect of the disclosure may comprise, before transmitting the data packet from the first device, providing an initial data packet that is according to the OSCORE protocol and comprises an encrypted data part and a metadata part, the metadata part comprising removable metadata, and the method further comprises modifying the initial data packet by adding removable metadata to the metadata part, the removable metadata comprising a network access code that is authenticatable by means of a network access key.

According to a second aspect of the present disclosure, there is provided a third device for secure communications over a network, and the third device may be the gateway mentioned above in relation to the first aspect of the disclosure. Therefore, the disclosure in its second aspect is a device that is or comprises a third device, such as a gateway, for secure communications over a network. The third device comprises a receiver configured to receive a data packet from a first device, the data packet comprising an encrypted data part and a metadata part, the metadata part comprising a cleartext part and removable metadata, the removable metadata comprising a network access code that is authenticatable by means of a network access key; a validator coupled to the receiver and comprising: a memory storing the network access key and instructions, and a processor configured to execute the instructions to cause the validator to validate the received data packet by: authenticating the network access code using the network access key; and removing the removable metadata from the data packet to alter the data packet; and a transmitter coupled to the validator and configured to receive the altered data packet and transmit the altered data packet to a second device.

In some embodiments, the validator may be circuits for computation. Alternatively, the validator can be a system or a combination of elements arranged in a computer or electronic device so as to perform tasks described herein. In some embodiments, the validator may comprise one or more processors and one or more memories storing instructions for performing the tasks specified herein.

The third device of the second aspect of the disclosure may have a transceiver that may be configured to perform the functions of each of the aforementioned receiver and transmitter. When the third device comprises the transceiver, then it may not comprise the aforementioned separate receiver and transmitter. Each of the aforementioned transceiver, receiver and transmitter may be configured for connecting to the network and receiving and/or transmitting data packets wirelessly and/or via wire.

The third device may further comprise a second receiver and/or a second transmitter and/or a second transceiver for pre-sharing and/or negotiating the network access key and/or the aforementioned data packet's optional timing information and/or first device time, as described further above in relation to the method of the first aspect of the disclosure.

The third device, may comprise the firmware and/or software that is required for the functions that the third device is configured for executing when operated.

According to a third aspect of the present disclosure, there is provided a system for secure communications over a network. The system comprises a second device configured to receive an altered data packet from a third device; and the third device comprising: a receiver configured to receive a data packet from a first device, the data packet comprising an encrypted data part and a metadata part, the metadata part comprising a cleartext part and removable metadata, the removable metadata comprising a network access code that is authenticatable by means of a network access key; a validator coupled to the receiver and comprising: a memory storing the network access key and instructions, and a processor configured to execute the instructions to cause the validator to validate the received data packet by: authenticating the network access code using the network access key; and removing the removable metadata from the data packet to alter the data packet; and a transmitter coupled to the validator and configured to receive the altered data packet and transmit the altered data packet to the second device.

In some embodiments, in the system of the third aspect of the disclosure, the first device may be a cloud server and the second device may be a constrained node. Likewise, in the system the third device may be a proxy to the second device. Overall, the system of the third aspect of the disclosure may be configured for executing the method of the first aspect of the disclosure.

FIG. 1 shows a schematic diagram of a system according to an aspect of the disclosure. The system shown in FIG. 1 comprises a first device 1 which is a server, specifically a cloud server, a third device 3, and a second device 2*a*. This particular system also comprises additional devices 2*b* and 2*c* which are similar in terms of functionality to the second device, and similarly to the latter they are constrained communications nodes, and are communicatively connected to the third device 3. The third device 3 is a gateway and a proxy to the second device 2 and the aforementioned additional second devices 2*b* and 2*c*. Therefore, communications between the first device 1 and the second device 2 are mediated by the third device 3. The devices are interconnected via several links 13, 32, 32*b*, 32*c*, 22*b*, 22*c* of the network, as shown in FIG. 1. Any of the links can be wired or wireless.

Figure 2:
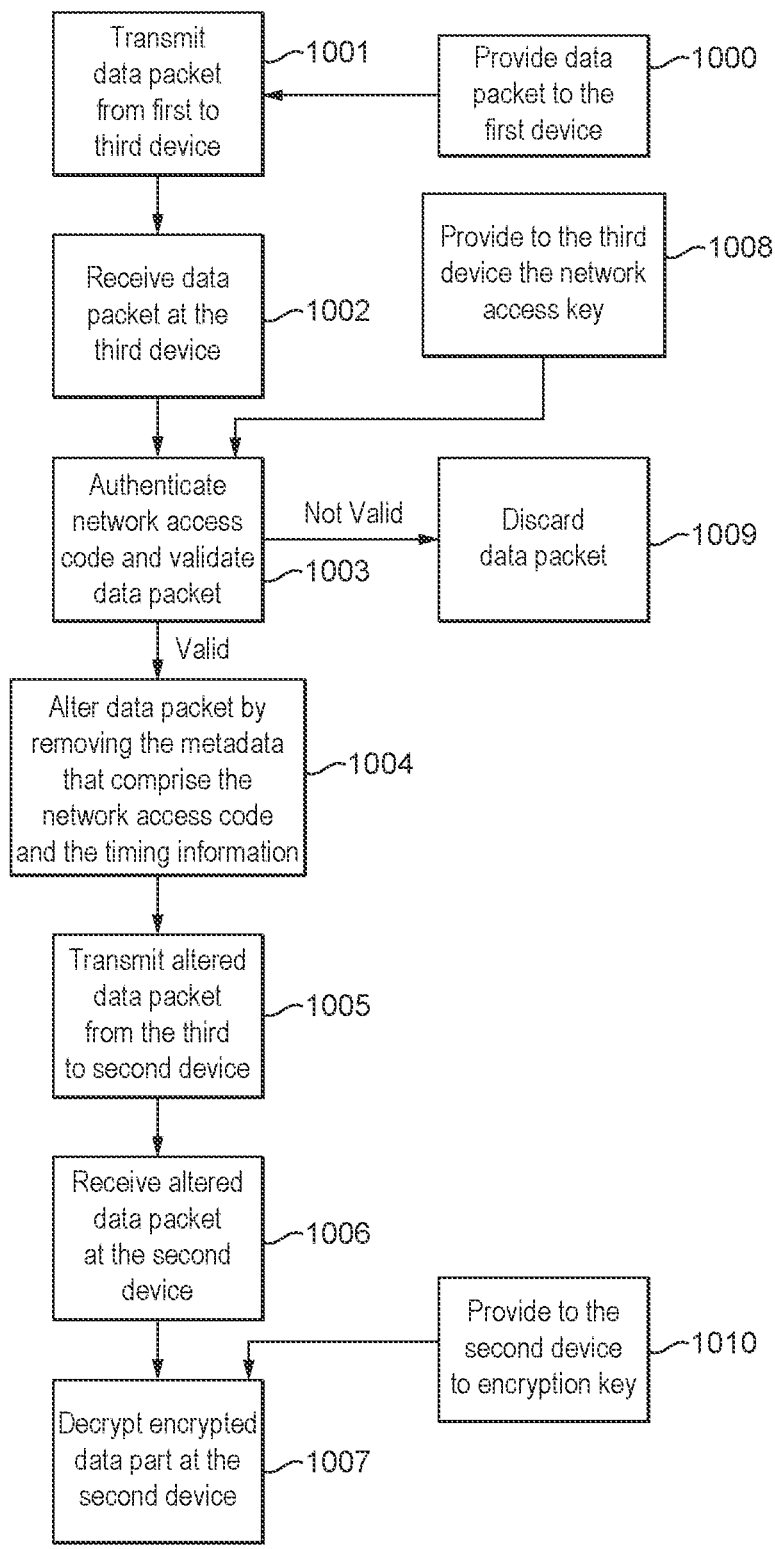
FIG. 2 is a flow diagram of a method according to a further aspect of the disclosure.

FIG. 2 shows a flow diagram of a method according to an aspect of the disclosure. The method shown in FIG. 2 comprises the following steps:

In step 1001 a data packet is transmitted from the first device to the third device. The data packet comprises an encrypted data part and a metadata part, the metadata part comprises removable metadata, the removable metadata comprises a network access code that is authenticatable by means of a network access key;

in step 1002 the data packet is received at the third device;

in step 1003 the network access code in the removable metadata is authenticated and the data packet is validated at (by) the third device;

in step 1004 the data packet is altered by removing the removable metadata, thereby producing an altered data packet;

in step 1005 the altered data packet is transmitted from the third device to the second device;

in step 1006 the altered data packet is received at the second device;

in step 1007 (decipher) the encrypted data part of the data packet is decrypted at the second device.

In the example of FIG. 2, validating, in step 1003, at the third device the data packet and authenticating the network access code (NAC) comprises checking whether the NAC and optionally another part of the removable metadata is valid or not, and proceeding to altering, in step 1004, the data packet only if the NAC or the another part is determined to be valid; if the NAC or another part of the removable metadata are determined as being not valid, then proceed to discarding, in step 1009, the data packet.

Moreover, the example shown in FIG. 2 comprises providing, in step 1008, to the third device the network access key before authenticating, in step 1003, at the third device the network access code. Likewise, in the example of FIG. 2 advantageously the removable metadata comprises timing information.

Likewise, the example shown in FIG. 2 comprises providing, in step 1010, to the second device the encryption key before decrypting, in step 1007, at the second device the data packet's encrypted data part using the encryption key. Likewise, in the example of FIG. 2 transmitting, in step 1001, the data packet from the first to the third device is optionally preceded by providing, in step 1000, the data packet to the first device. The providing, in step 1000, the data packet(s) can be either sending/inputting/transmitting the data packet to the first device, and/or preferably generating the data packet at the first device or in a data packet generating device that is communicatively connected to the first device. Therefore, preferably the first device, or alternatively the data packet generating device, is configured for generating the data packet(s).

Figure 3:
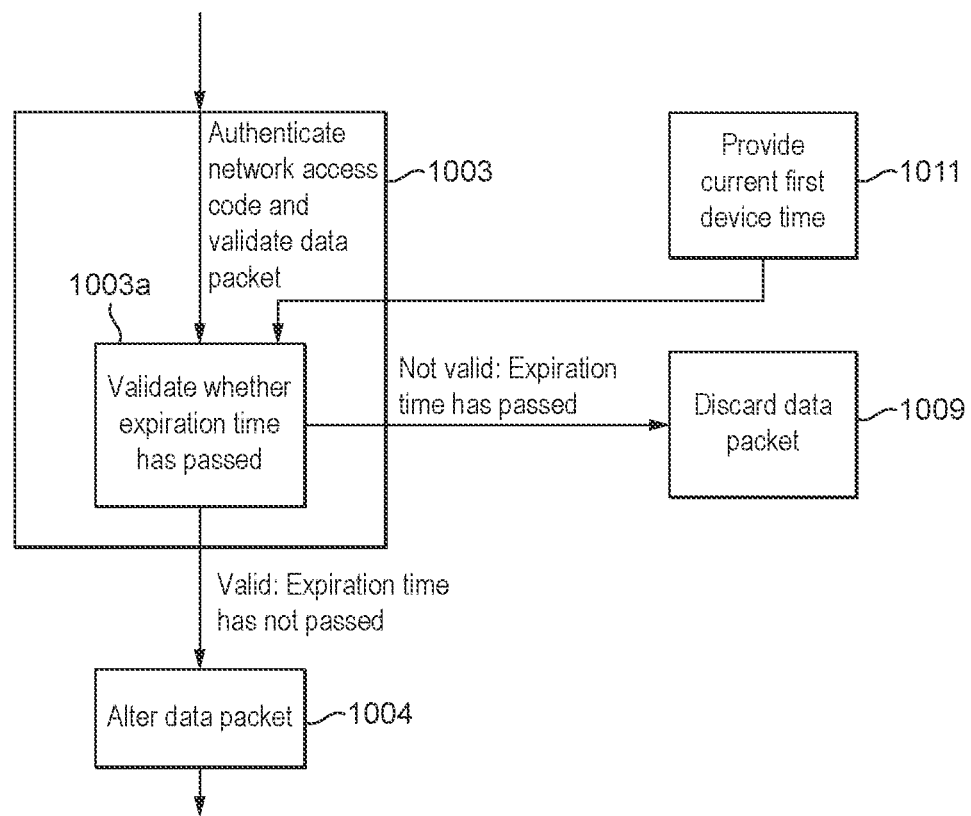
FIG. 3 is a flow diagram of a part of a method according to an aspect of the disclosure.

FIG. 3 is a flow diagram of a part of a method according to an aspect of the disclosure. In the example of FIG. 3 the data packet's removable metadata of the metadata part comprises an indication of an expiration time, and the method, and more specifically validating, in step 1003, the data packet, comprises validating, in step 1003*a*, at the third device whether the expiration time has passed. Moreover, for validating, in step 1003*a*, the expiration time, the method comprises providing, in step 1011, a current first device time to the third device, because in the specific embodiment shown, validating, in step 1003, whether the expiration time has passed comprises comparing the expiration time with a current first device time. Moreover, the method of FIG. 3 comprises discarding, in step 1009, the data packet if the expiration time has passed, or altering, in step 1004, the data packet if the expiration time has not passed. By discarding, in step 1009, expired or invalid or non-authentic data packets, the unnecessary traffic from the third to the second device is eliminated or minimized, thereby optimizing the use of the bandwidth and power resources of the second device.

Figure 4:
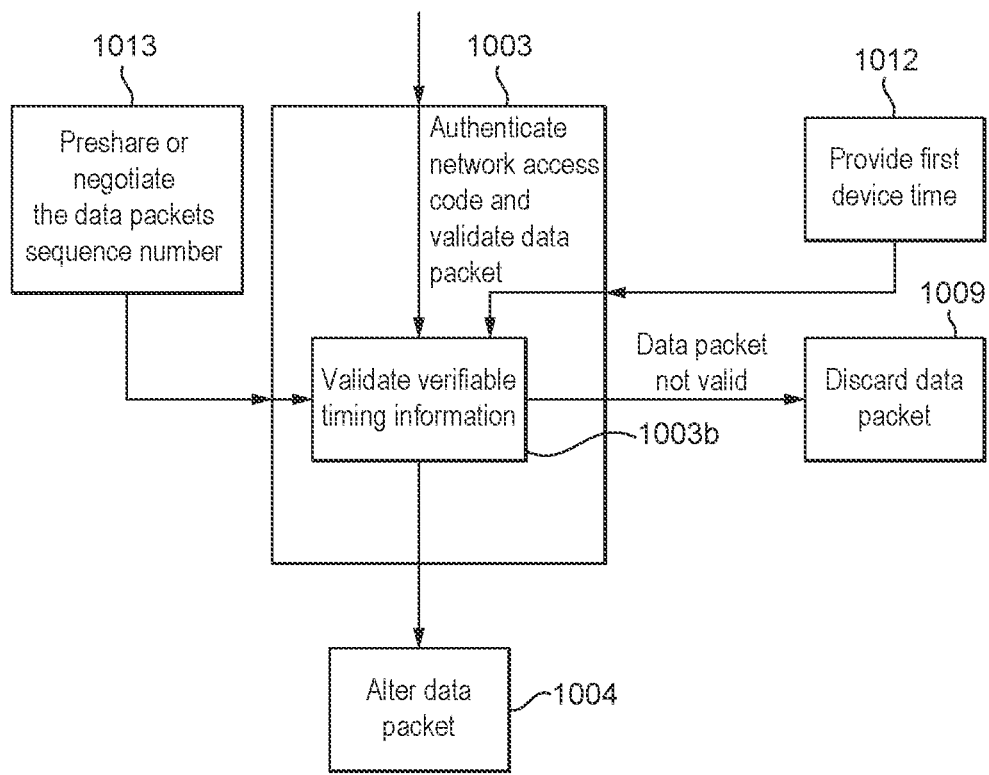
FIG. 4 is a flow diagram of a part of an alternative method according to an aspect of the disclosure.

FIG. 4 is a flow diagram of a part of an alternative method according to an aspect of the disclosure. In the example of FIG. 4 the data packet's removable metadata comprises a network access code and verifiable timing information, the verifiable timing information comprising a timestamp or a sequence number. Likewise, in the example of FIG. 4 validating, in step 1003, the data packet comprises authenticating the network access code and validating, in step 1003*b*, the verifiable timing information. Moreover, the method of FIG. 4 comprises providing, in step 1012, to the third device a first device time, such as the aforementioned current first device time, and also comprises pre-sharing or negotiating, in step 1013, between the third and the first device the aforementioned data packet's sequence number.

Moreover, the method of FIG. 4 comprises discarding, in step 1009, the data packet if the latter is deemed to be not valid, and altering, in step 1004, the data packet if the latter is deemed to be valid.

Different examples of data packets used in the method of an aspect of the disclosure, are schematically illustrated in FIGS. 5A-5D. In the example in FIG. 5A, the data packet 20 comprises a header 201, an encrypted data part 203, and removable metadata 202 that comprises an expiration time and a network access code. The header 201 is in cleartext form. The network access code may be a message authenticate code (MAC). The MAC may be in cleartext.

In some embodiments, the data packet comprises at least one of optional timing information, a timestamp, a sequence number, or an indication of an expiration time. At least one of the network access code, the optional timing information, the timestamp, the sequence number, or the indication of the expiration time, is in cleartext.

Figure 5A:
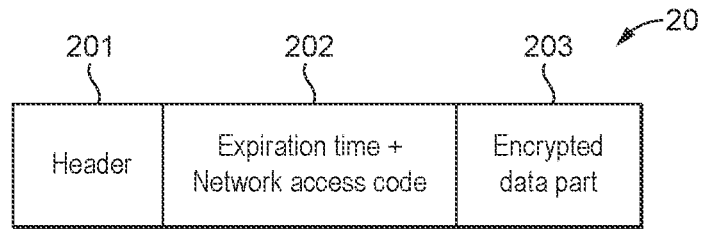
FIG. 5A schematically illustrates the structure of an example data packet transmitted from the first to the third device in a method according to an aspect of the disclosure.
Figure 5B:
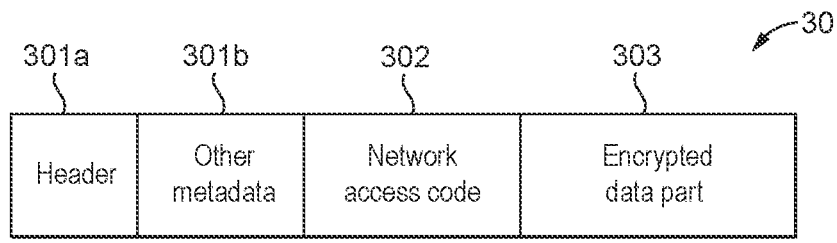
FIG. 5B schematically illustrates the structure of an example data packet transmitted from the first to the third device in a method according to an aspect of the disclosure.

In the example in FIG. 5B the data packet 30 comprises the header 301a which can be considered as being metadata, some other metadata 301b, an encrypted data part 303, and a network access code 302. In the example in FIG. 5B, parts 301a, 301b of the data packet are in cleartext. Moreover, the network access code 302 is removable, and the data packet portion comprising the header 301a, the other metadata 301b and the encrypted data part is compatible with the OSCORE protocol.

Figure 5C:
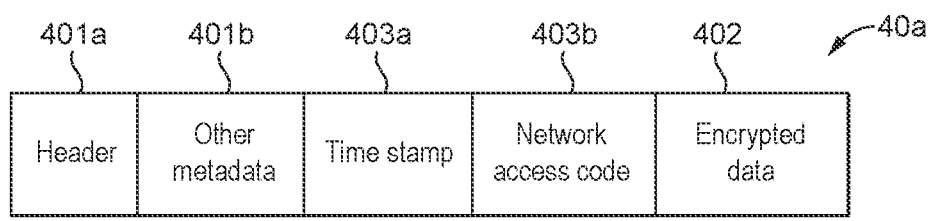
FIG. 5C schematically illustrates the structure of an example data packet transmitted from the first to the third device in a method according to an aspect of the disclosure.
Figure 5D:
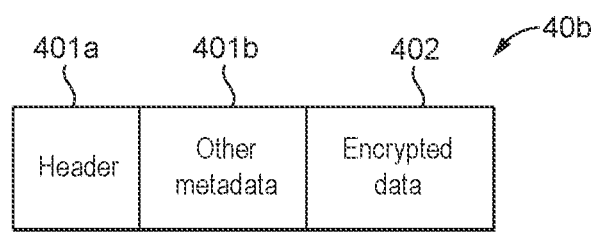
FIG. 5D schematically illustrates the structure of an example altered data packet transmitted from the third to the second device, the altered data packet resulting from removing the removable metadata from the data packet of FIG. 5C.

In the example in FIG. 5C, the data packet 40a comprises the header 401a, the other metadata 401b, a time stamp 403a, a network access code 403b and an encrypted data part 402. After altering the data packet 40a of FIG. 5C by removing the time stamp 403a and the network access code 403b, there is left the data packet 40b that is shown in FIG. 5D and comprises the header 401a, the other metadata 401b and the encrypted data part 402. The altered data packet 40b in FIG. 5D is compatible with the OSCORE protocol.

Figure 6A:
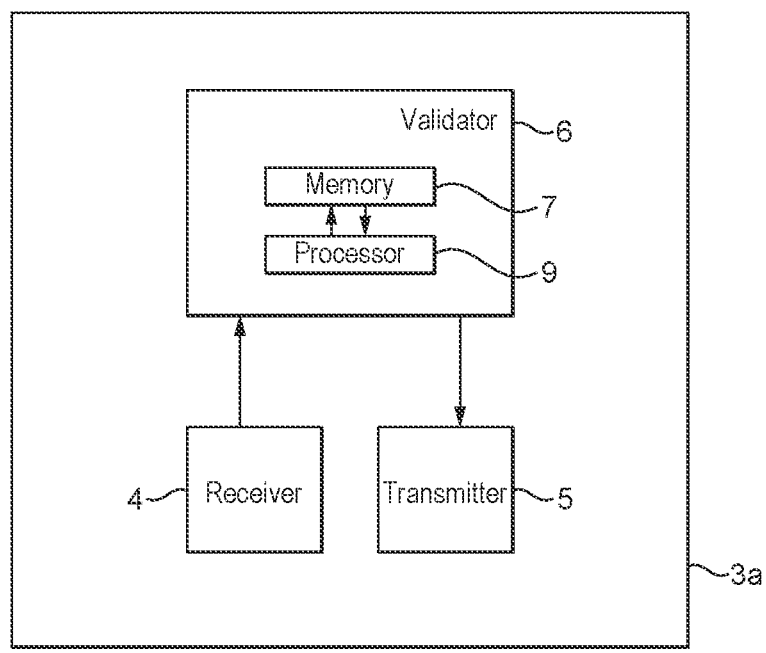
FIG. 6A is a schematic diagram of an example of a third device according to another aspect of the disclosure.

A gateway 3a that is an example of a third device according to an aspect of the disclosure is shown in the schematic diagram of FIG. 6A which further shows that the gateway 3a comprises:
 a receiver 4 configured for receiving a data packet from a first device, the data packet comprising an encrypted data part and a metadata part, the metadata part comprising removable metadata, the removable metadata comprising a network access code that is authenticatable by means of a network access key;
 a validator 6 coupled to the receiver 4, validator 6 comprising a memory 7 to store the network access key and instructions, and a processor 9 configured to execute the instructions to cause the validator to validate the received data packet by authenticating the network access code using the network access key, and upon validation, removing from the data packet the removable metadata, thusly altering the data packet;
 a transmitter 5 coupled to the validator 6 to receive from the latter the altered data packet and configured for transmitting the altered data packet to a second device.

Figure 6B:
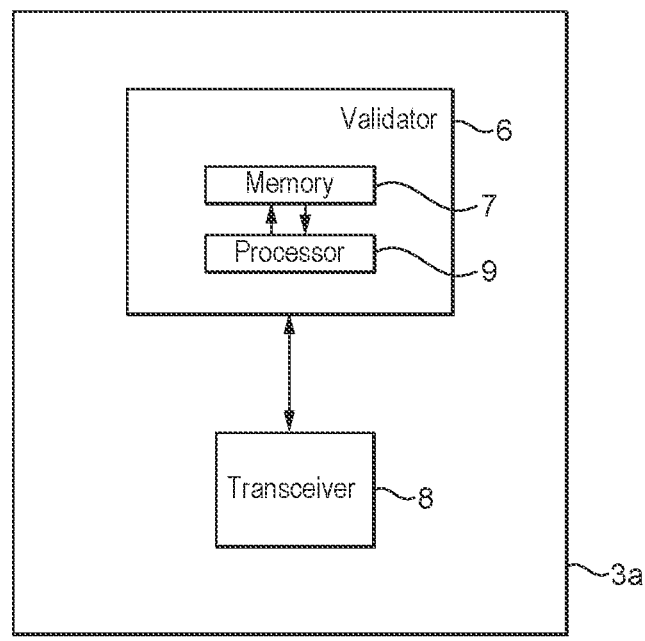
FIG. 6B is a schematic diagram of another example of a third device according to an aspect of the disclosure.

Another gateway 3a that is another example of a third device according to an aspect of the disclosure is shown in the schematic diagram of FIG. 6B which further shows that the another gateway 3a is similar to the gateway 3a shown in FIG. 3A, with the main difference being that in the another gateway 3a receiver 4 and transmitter 5 have been replaced by a single transceiver 8 which functions as both a transmitter and a receiver.

Although specific terms are used in the previous description for the sake of clarity, these terms have been presented for the purposes of illustration and description of the disclosure. It is not intended to be exhaustive or limit the disclosure to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use.

What is claimed is:

1. A method for secure communications over a network, the method comprising:
 receiving, by a third device, a data packet from a first device, the data packet comprising an encrypted data part and a metadata part, the metadata part comprising a cleartext part and removable metadata, the removable metadata comprising: a network access code that is authenticatable by means of a network access key, and an indication of an expiration time;
 validating, by the third device, the data packet, wherein validating the data packet comprises:
  authenticating the network access code using the network access key;
  validating whether the expiration time has passed by comparing the expiration time with a current time of the first device, wherein the third device obtains the current time via the first device; and
  discarding the data packet if the expiration time has passed, or authentication of the network access code fails, or both the expiration time has passed and the authentication of the network access code fails;
 removing, by the third device, the removable metadata from the data packet after validating the data packet, thereby altering the data packet; and
 transmitting, by the third device, the altered data packet to a second device.

2. The method according to claim 1, wherein:
 the first device is a cloud server; and
 the second device is a constrained node.

3. The method according to claim 1, wherein the removable metadata further comprises verifiable timing information, the verifiable timing information comprising a timestamp or a sequence number.

4. The method according to claim 3, further comprising:
 receiving, by the third device, from the first device or negotiating, by the third device, with the first device, at least one of:
  a rule or a recurrence relation that defines a sequence that includes the sequence number;
  a first sequence number of the sequence; or
  an initial term of the recurrence relation.

5. The method according to claim 3, wherein validating, by the third device, the data packet further comprises:
 validating the verifiable timing information for determining whether the data packet is valid; and
 discarding the data packet when determining that the data packet is not valid.

6. The method according to claim 5, wherein:
 when the verifiable timing information comprises the timestamp, validating the verifiable timing information comprises comparing the timestamp with a time moment of the first device when the data packet is created, present in, or transmitted by the first device; or when the verifiable timing information comprises the sequence number, validating the verifiable timing information comprises comparing the sequence number with an expected sequence number.

7. The method according to claim 1, further comprising: queuing, by the third device, a plurality of data packets.

8. The method according to claim 1, further comprising: receiving, by the third device, the network access key from the first device, wherein the network access key is derived from a trusted source.

9. The method according to claim 8, wherein receiving, by the third device, the network access key comprises:
negotiating, by the third device, the network access key with the first device.

10. The method according to claim 8, wherein the trusted source is a hardware root of trust.

11. The method according to claim 1, wherein the removable metadata are in cleartext or comprise a portion that is in cleartext.

12. The method according to claim 1, wherein:
the data packet further comprises at least one of optional timing information, a timestamp, or a sequence number; and
at least one of the network access code, the optional timing information, the timestamp, the sequence number, or the indication of the expiration time, is in cleartext.

13. A third device for secure communications over a network, the third device comprising:
a receiver configured to receive a data packet from a first device, the data packet comprising an encrypted data part and a metadata part, the metadata part comprising a cleartext part and removable metadata, the removable metadata comprising: a network access code that is authenticatable by means of a network access key, and an indication of an expiration time;
a validator coupled to the receiver and comprising:
a memory storing the network access key and instructions, and
a processor configured to execute the instructions to cause the validator to validate the received data packet by:
authenticating the network access code using the network access key;
validating whether the expiration time has passed by obtaining a current time via the first device and comparing the expiration time with the current time of the first device;
discarding the data packet if the expiration time has passed, or authentication of the network access code fails, or both the expiration time has passed and the authentication of the network access code fails; and
removing the removable metadata from the data packet to alter the data packet; and
a transmitter coupled to the validator and configured to receive the altered data packet and transmit the altered data packet to a second device.

14. The third device according to claim 13, wherein the processor is further configured to execute the instructions to cause the third device to:
negotiate the network access key with the first device.

15. A system for secure communications over a network, the system comprising:
a third device comprising:
a receiver configured to receive a data packet from a first device, the data packet comprising an encrypted data part and a metadata part, the metadata part comprising a cleartext part and removable metadata, the removable metadata comprising: a network access code that is authenticatable by means of a network access key, and an indication of an expiration time;
a validator coupled to the receiver and comprising:
a memory storing the network access key and instructions, and
a processor configured to execute the instructions to cause the validator to validate the received data packet by:
authenticating the network access code using the network access key;
validating whether the expiration time has passed by obtaining a current time via the first device and comparing the expiration time with the current time of the first device;
discarding the data packet if the expiration time has passed, or authentication of the network access code fails, or both the expiration time has passed and the authentication of the network access code fails; and
removing the removable metadata from the data packet to alter the data packet; and
a transmitter coupled to the validator and configured to receive the altered data packet and transmit the altered data packet to a second device.

16. The system according to claim 15, wherein:
the first device is a cloud server;
the second device is a constrained node; and
the third device is a gateway.

17. The system according to claim 15, wherein the third device is configured as a proxy to the second device.

18. The system according to claim 15, wherein the removable metadata comprises verifiable timing information, the verifiable timing information comprising a timestamp or a sequence number.

* * * * *